United States Patent [19]

Zink et al.

[11] Patent Number: 5,042,002
[45] Date of Patent: Aug. 20, 1991

[54] PROGRAMMABLE CONTROLLER WITH A DIRECTED SEQUENCER

[75] Inventors: Steven M. Zink, Hudson, Ohio; Marvin J. Schwenke, Sterling Heights, Mich.; Arthur P. Pietrzyk, Thomson, Ohio; David R. Killian, North Royalton, Ohio; James D. Coburn, Cleveland Heights, Ohio

[73] Assignee: Allen-Bradley Company, Inc., Milwaukee, Wis.

[21] Appl. No.: 332,653

[22] Filed: Mar. 31, 1989

[51] Int. Cl.$^5$ .............................................. G05B 19/00
[52] U.S. Cl. .............................. 364/900; 364/926.93; 364/949; 364/947.2; 364/946.2
[58] Field of Search ... 364/200 MS File, 900 MS File

[56] References Cited

U.S. PATENT DOCUMENTS

| | | | |
|---|---|---|---|
| 3,974,484 | 8/1976 | Struger et al. | 340/172.5 |
| 4,302,820 | 11/1981 | Struger et al. | 364/900 |
| 4,442,504 | 4/1984 | Dummermuth et al. | 364/900 |
| 4,742,443 | 5/1988 | Rohn et al. | 364/136 |
| 4,858,101 | 8/1989 | Stewart et al. | 364/147 X |
| 4,858,102 | 8/1989 | Lovrenich | 364/147 X |
| 4,876,664 | 10/1989 | Bittorf et al. | 364/900 |
| 4,937,777 | 6/1990 | Flood et al. | 364/900 |

OTHER PUBLICATIONS

Master's thesis from the Massachusetts Institute of Technology entitled, "A CRT-Based State Transition Language for Industrial Sequential Control" dated Jun. 1981.

Kompass, E. J.; "Distributed Machine Control Uses Zoned Logic, Isolated Controllers, Fiber Optics"; Control Engineering; Aug. '87; pp. 61-63.

Roberts, Ralph; Zone Logic; Compute! Books.

Chapter 15 of the "Programming and Operations Manual" for the Allen-Bradley Company PLC-2/30 programmable controller, Apr., 1988.

Primary Examiner—Thomas M. Heckler
Attorney, Agent, or Firm—Quarles & Brady

[57] ABSTRACT

A programmable controller for sensing the status of input devices and controlling the state of operating devices in accordance with a stored ladder logic control program includes a step sequencer. A memory is provided for storing data regarding each step of the sequence. This data defines the operating device states for each step, and the legitimate transitions from that step to other selected steps in the sequence, along with the input status conditions which trigger a step transition. A processor responds to a ladder logic instruction by comparing the status of the input devices to the stored input status conditions for the current step to detect if a step transition should occur. Upon such a detection the sequencer advances to the step associated with the detected input status condition. Should an illegal transition from one step to another occur, an error message is generated. A step timer is also incorporated to force a transition when the sequencer remains at the same step longer than a defined period of time.

26 Claims, 10 Drawing Sheets

5,042,002

PROGRAMMABLE CONTROLLER WITH A DIRECTED SEQUENCER

The present invention relates to electronic controllers for operating industrial equipment, and more specifically to programmable controllers and sequence controllers such as disclosed in U.S. Pat. Nos. 3,974,484 and 4,742,443.

BACKGROUND OF THE INVENTION

Programmable controllers are well known devices for operating industrial equipment such as assembly lines and machine tools, in accordance with a stored program. In such controllers, the control program is stored in a memory and includes instructions which are read out in rapid sequence and executed to examine the condition of selected sensing devices on the controlled equipment, and to energize or deenergize selected operating devices on the controlled equipment contingent upon the status of one or more of the examined sensing devices. Other instructions are provided not only to manipulate single-bit input and output data representing the state of the sensing and operating devices, but also to perform arithmetic operations, timing and counting functions, and more complex processing operations.

In carrying out its functions, programmable controller processor is expected to execute certain well-known programmable controller type instructions. Such instructions have become quite standardized in the industry and they are directly associated with the elements of a ladder logic diagram which is easily understood by control engineers. Program panels such as those described in U.S. Pat. Nos. 3,798,612; 3,813,649 and 4,070,702 have been developed to assist the user in developing and editing ladder logic control programs comprised of such programmable controller instructions. Another type of machine controller is a sequencer, such as a mechanical rotating drum sequencer of the type which controls washing machines. This mechanical type device has a program drum, or cylinder, which rotates. A series of projecting tabs on the drum are aligned to make or break electrical switch contacts as the drum rotates in a predefined direction. Thus, as the drum rotates, stepping through a set sequence, various combinations of outputs may be energized or deenergized. The conventional sequencer has been implemented as a programmable electronic device, such as the one described in U.S. Pat. No. 3,974,484. The traditional sequencer has the advantage that in the event of an error condition, the state of the equipment that prompted the error condition are easily determined. One drawback of this type of controller is that the control must always advance from each step to the same subsequent step. In many control processes, however, it is necessary to advance from one step to one of several subsequent steps depending upon the state of several parameters of the control process.

It is therefore advantageous to be able to utilize a sequencer type control device with its ability to construct an error history with a programmable controller. Such a hybrid type device would enable transitions from a given step to one of several subsequent steps depending upon the state of various input conditions being sensed by the programmable controller.

SUMMARY OF THE INVENTION

A programmable controller has a processor which repeatedly executes instructions of a stored control program. The execution of the control program examines the status of input devices connected to the controller and operates output devices also connected to the controller in accordance with the condition of selected input devices. The programmable controller includes a memory which has a first section for storing data relating to a series of machine control steps. The data for each step includes the statuses for the output devices; a designation of one or more transitions which can occur from that step to other steps in the series; and for each such transition, a change in the state of an input device which indicates that the specific transition should take place. The memory also includes a storage location for storing an indication of at which one of the series of steps the control program is currently functioning.

The programmable controller includes a means for setting the states of the output devices to correspond to the states stored for the currently active machine control step. A detection means also is provided for sensing when one of the input devices undergoes a designated state change which indicates a transition in the steps of the control sequence. Additional means are responsive to this sensed step transition condition for storing an indication of the next sequence step in the storage location.

An object of the present invention is to provide a sequencer in which a transition can occur from a given step to one of several subsequent steps in response to one of a plurality of predefined input devices changing states.

Another object of the present invention is to provide a sequence type control function which is executable from a conventional ladder type control program.

A further object of the present invention is to provide an indication of where in the control program an error occurred and the conditions which led to that error.

An object of the present invention is to provide a transition to a predefined step upon the occurrence of an error condition.

Yet another object is to provide a mechanism for forcing a defined transition to occur, if the sequencer remains at a given step for more than a predetermined amount of time.

BRIEF DESCRIPTION OF THE DRAWINGS

FIG. 1A is a schematic block diagram of a processor module which forms part of the controller of FIG. 1;

DETAILED DESCRIPTION OF THE INVENTION

The present concept is the integration of an improved sequence control function into a programmable controller system. The sequence control function is provided by an additional instruction for use with standard ladder diagram type control programs for the programmable controller. In order to understand the operation of the sequence control function, an understanding of the hardware for a typical programmable controller will be beneficial.

Figure 1:
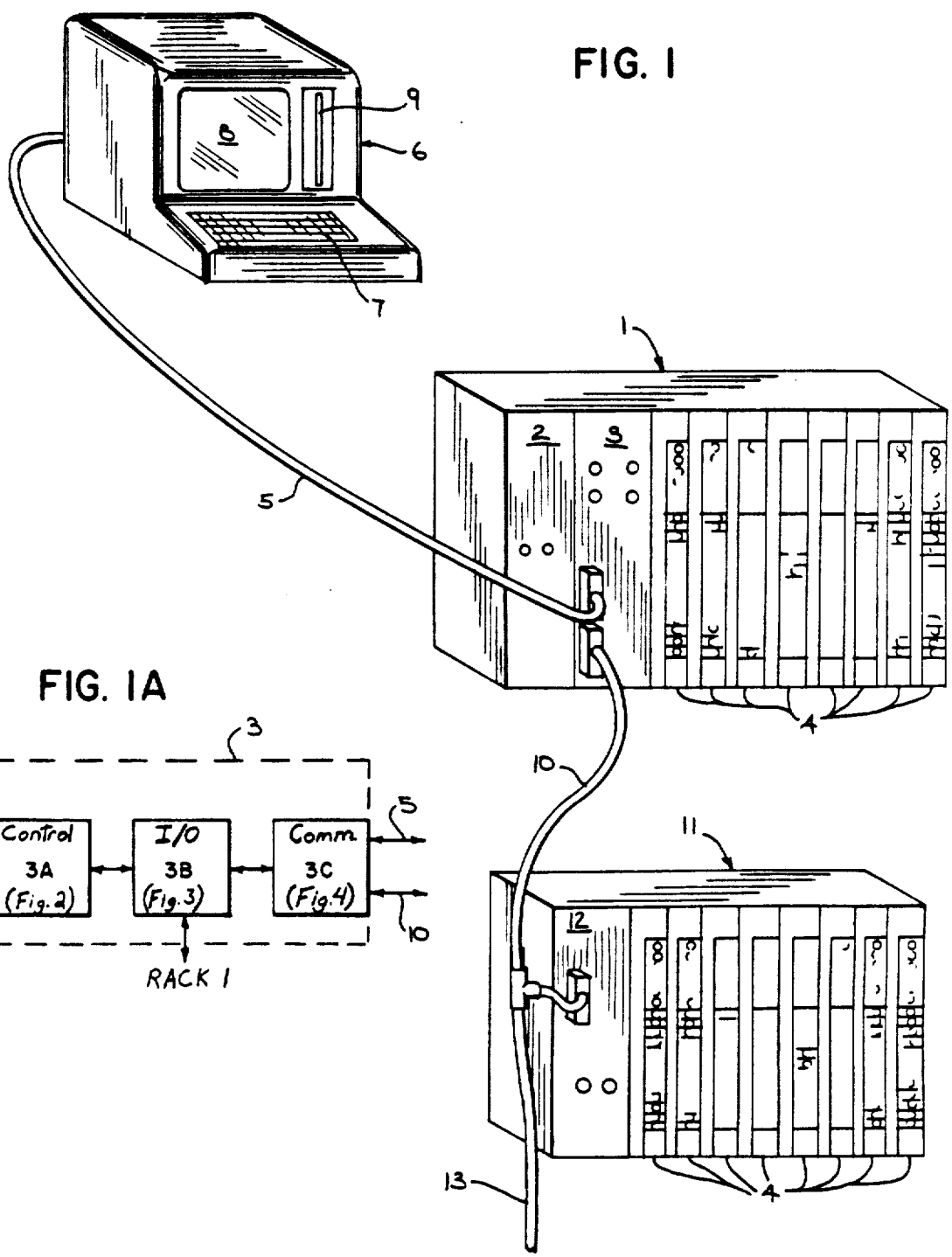
FIG. 1 is a perspective view of a programmable controller which employs the present invention.

Referring to FIG. 1, the programmable controller of the present invention is housed in a rack 1 which includes a series of slots that receive modules 2-4. These modules connect to a motherboard which extends along the back surface of the rack 1 to provide a backplane. The modules include a power supply module 2, a processor module 3 and a series of up to eight input or output (I/O) modules 4. The I/O modules 4 take many forms and may include, for example, d.c. inputs or outputs, a.c. inputs or outputs, analog inputs or outputs, and open and closed loop positioning modules. The physical construction of the rack 1 is disclosed in U.S. Pat. No. 4,151,580.

The processor module 3 is connected through a cable 5 to a programming terminal 6. The programming terminal 6 includes a keyboard 7 through which the user may enter data to program the processor module 3, operate the processor module, or monitor its operation. Alphanumeric data, as well as ladder diagram representations of user control programs, are produced on a CRT display 8, and programs and data may be archived on a floppy disk which is received in a disk drive unit 9.

The processor module 3 may also connect through a cable 10 to a remote I/O rack 11. The I/O rack 11 is similar in construction to the rack 1 and contains a similar assortment of I/O modules 4 which connect through a backplane motherboard to an I/O adaptor module 12. The I/O adaptor module is described in U.S. Pat. No. 4,413,319 and it functions to couple data between the I/O modules 4 in rack 11 and the processor module 3 in rack 1. Similar remote I/O racks 11 may be connected to a cable 13 which connects to the I/O adaptor module 12.

As will be explained in more detail below, the user enters a control program into the memory of the processor module 3 through the programming terminal 6. The processor is then placed in the "RUN" mode in which it repeatedly executes the stored control program to operate output devices connected to output modules 4 in the racks 1 and 11 in response to the condition of input devices connected to input modules 4. The circuitry of the processor module 3 and its basic operating software are described in detail in U.S. Pat. No. 4,742,443 entitled "Programmable Controller With Function Chart Interpreter", which description is incorporated by reference herein. However, in order to understand the present invention, an overview of the processor will be presented.

Processor Hardware

Figure 2:
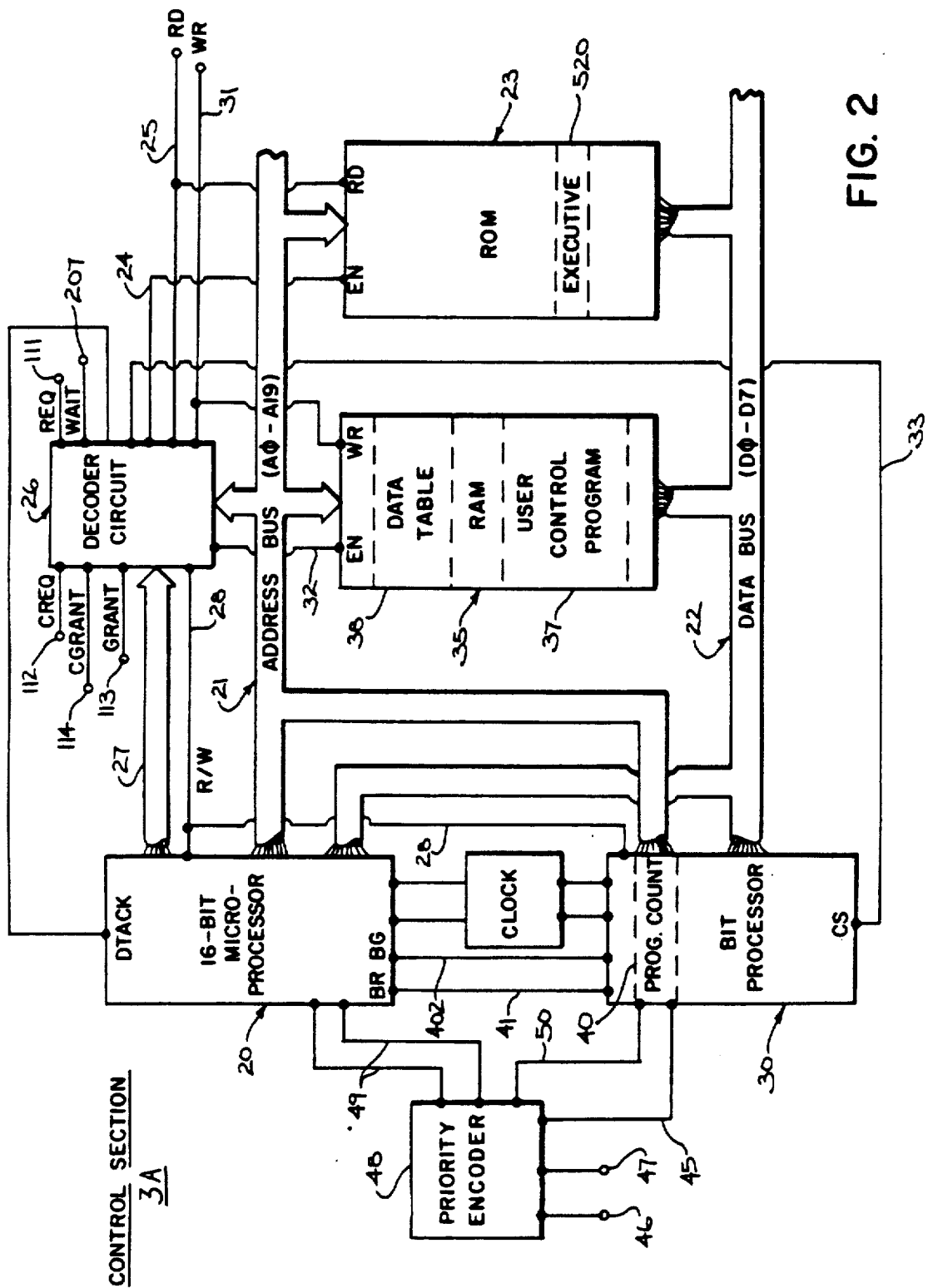
FIG. 2 is an electrical schematic diagram of a control section which forms part of the processor module of FIG. 1A.
Figure 3:
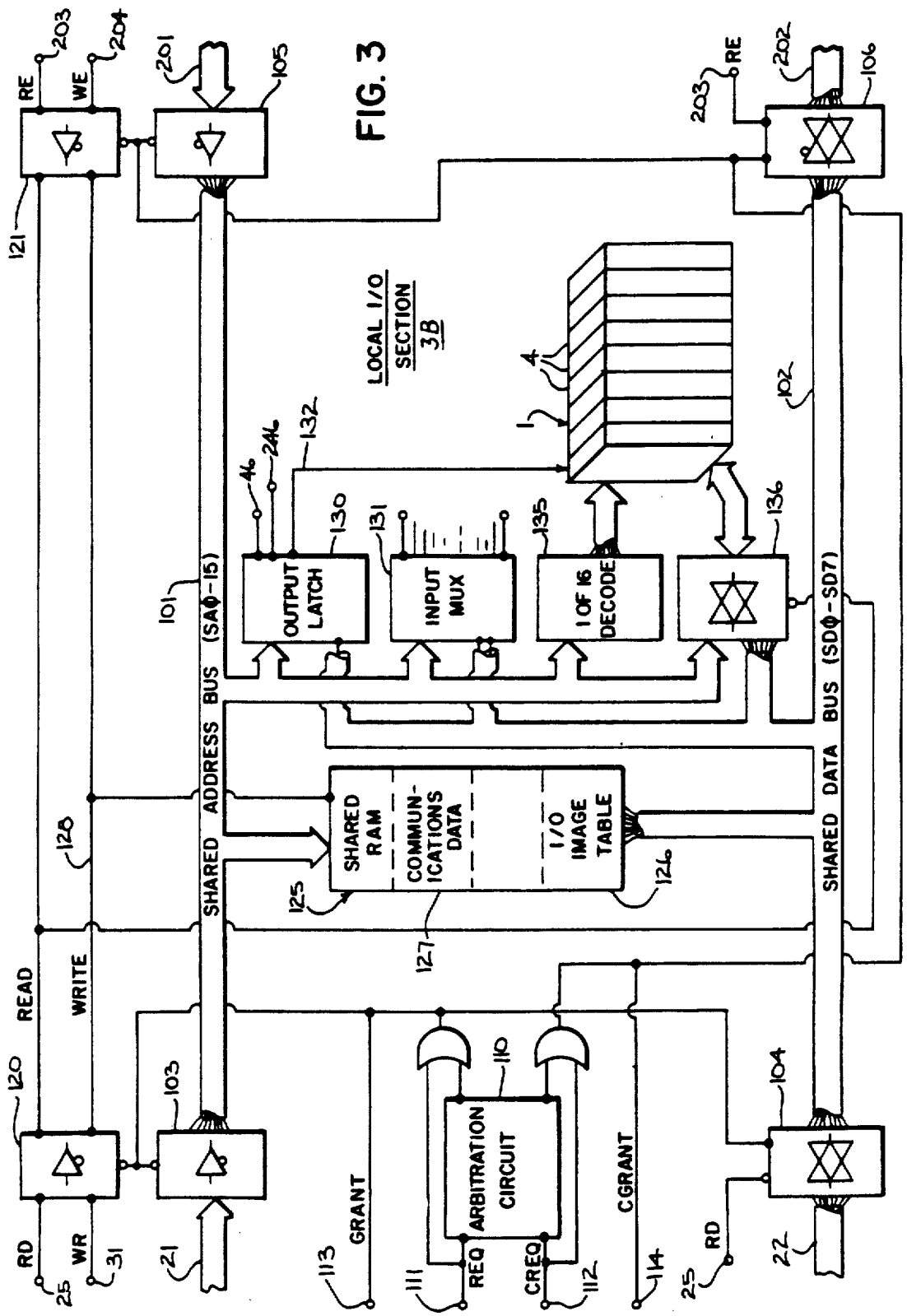
FIG. 3 is an electric schematic diagram of a local I/O section of the processor module of FIG. 1A.
Figure 4:
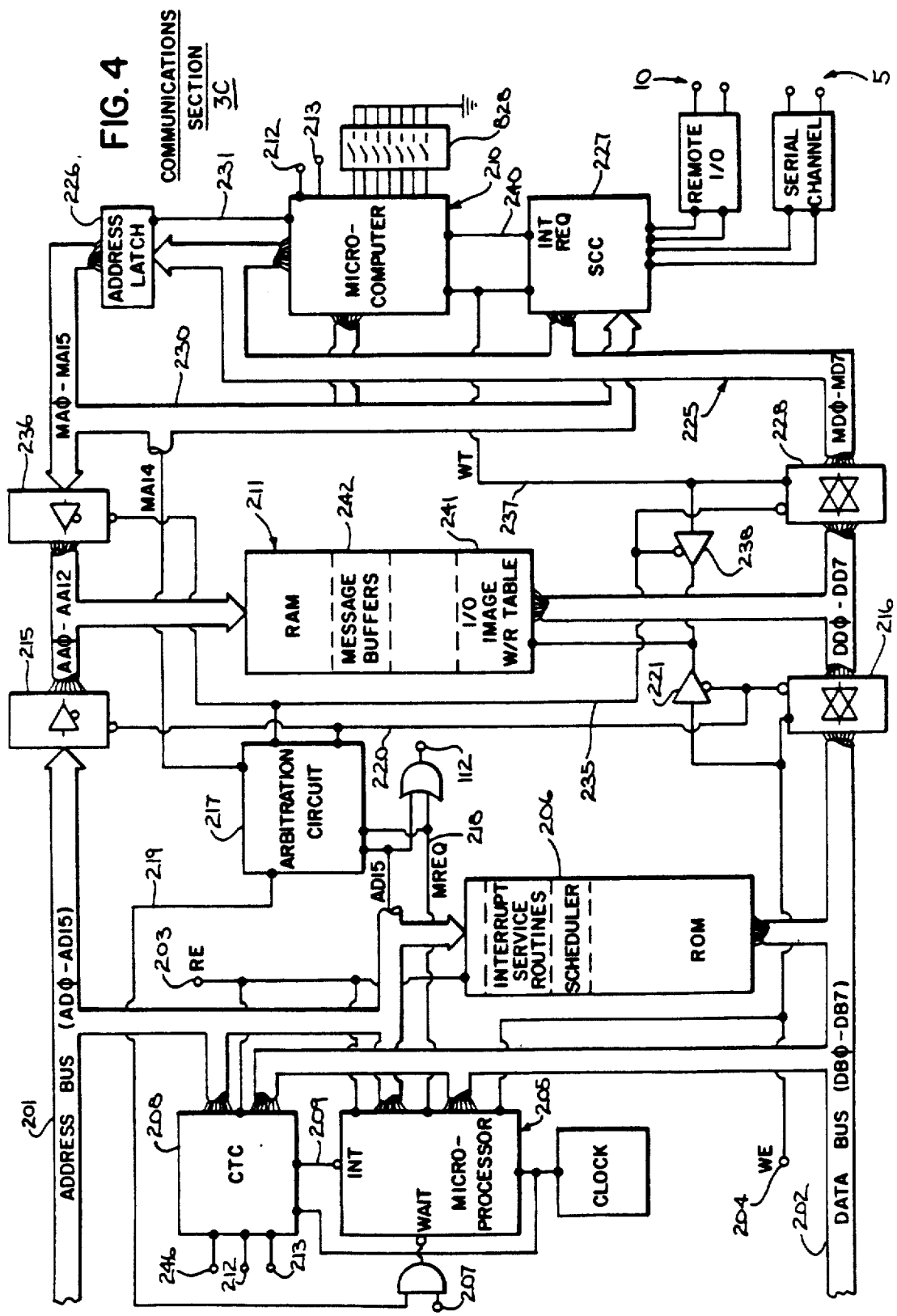
FIG. 4 is an electrical schematic diagram of a communications section of the processor module of FIG. 1A.

Referring to FIGS. 1A and 2-4, the processor module 3 is logically divided into three sections; a control section 3A shown in FIG. 2; a local I/O section 3B shown in FIG. 3; and a communications section 3C shown in FIG. 4. The control section 3A is primarily responsible for storing and executing the user's control program. The communications section 3C has the principal responsibility for communicating with the programming terminal 6 and the remote I/O racks 11, and the primary functions of the local I/O section 3B are to communicate with the I/O modules 4 in the rack 1 and to couple the control section 3A with the communications section 3C. Each of these sections of the processor module 3 will now be described in more detail.

Referring particularly to FIG. 2, the control section 3A is structured about a sixteen-bit microprocessor 20 which drives a twenty-lead address bus 21 and an eight-lead data bus 22. The microprocessor 20 executes machine language instructions, which are stored in a read-only memory (ROM) 23, to carry out its functions. These machine language instructions are addressed by a program counter in the microprocessor 20 and are read from the addressed storage location of the ROM 23 when an enable control line 24 and a read control line (RD) 25 are active. The fetched instruction is decoded and executed by the microprocessor 20 to carry out the indicated function. The functions performed in response to the execution of these machine language instructions, or "firmware", and the organizations of the firmware, will be described in more detail below.

Data may be read from or written to other components of the processor module 3 which are connected to the buses 21 and 22. The particular component is enabled by a decoder circuit 26 which receives address data from the address bus 21 and control signals from a control bus 27 that is driven by the microprocessor 20. The decoder circuit 26 also receives a signal from a R/W control line 28 which may be driven either by the microprocessor 20 or a separate bit processor 30, and it receives a number of other input signals which will be described in more detail below. In addition to the RD control line 25 and the ROM enable control line 24 described above, the decoder circuit 26 drives a write enable (WR) control line 31, a RAM enable control line 32, and a bit processor enable line 33. The other inputs to and outputs from the decoder circuit 26 will be discussed below in connection with the local I/O section 3B.

A random access memory (RAM) 35 connects to the buses 21 and 22, and data may be read from or written to an addressed location therein when the RAM enable control line 32 is active. The RAM 35 stores a variety of data structures which will be described in more detail below. However, most of these structures form part of a user control program indicated at section 37 or a data table indicated at section 38. The user control program includes one or more ladder logic programs that are comprised of instructions which are familiar to users or programmable controllers and which ar loaded into the RAM 35 through the programming terminal 6. The user control program 37 also includes a sequencer routine which is unique and which is described in greater detail subsequently. The microprocessor 20 executes the user control program, and depending on its type, a ladder program instruction may be executed either by the microprocessor 20 or the bit processor 30, as is well known.

When the microprocessor 20 executes a control program instruction, it employs an operation code in the instruction to locate a corresponding machine language interpreter routine which is stored in the ROM 23. The microprocessor 20 thus executes ladder program instructions by executing corresponding interpreter routines stored in the ROM 23. This interpretive technique for executing ladder programs is described in U.S. Pat. Nos. 4,165,534; 4,282,584 and 4,443,865.

The bit processor 30 is a custom integrated circuit which operates in tandem with the microprocessor 20 to execute directly selected ones of the ladder program instructions. The microprocessor 20 begins the execution of the ladder program (i.e. the program scan), but it immediately relinquishes control to the bit processor 30. This transfer of control is accomplished by writing the address of the ladder program instruction to a ladder program counter register 40 in the bit processor 30. The bit processor 30 then effectively removes the microprocessor 20 from the buses 21, 22 and 27 by enabling a bus request terminal through control line 41. The bit processor 30 fetches the ladder program instruction, executes it, and fetches subsequent ladder program instructions and executes them until one is encountered which it cannot execute. At that point, the bus request line 41 is released and the microprocessor 20 resumes control of program execution. The microprocessor 20 reads the contents of the ladder program counter register 40 into its own ladder program counter and proceeds to fetch and execute the indicated ladder program instruction. While the bit processor 30 is constructed to execute only a few "bit oriented" instructions, 75 to 95 percent of typical user ladder programs are comprised of these instructions. As a result, the total program scan time is significantly reduced by executing these few instruction types within the dedicated, high-speed bit processor 30.

The bit processor 30 also includes a real time clock (not shown in FIG. 2) which produces an interrupt signal on control line 45 at regular intervals. This interrupt request, as well as two others on lines 46 and 47, are applied to the inputs of a priority encoder 48. The priority encoder 48 produces a two-bit interrupt request to the microprocessor 20 on lines 49, and indicates an interrupt request to the bit processor 30 through line 50. If the bit processor 30 has control at the moment of an interrupt request, it relinquishes control to the microprocessor 20 in the manner described above. The interrupt produced by the bit processor 30 is employed to implement a real time interrupt instruction as described in U.S. Pat. No. 4,638,452. The interrupt on line 46 emanates from the communications section 3C of the processor module 3 and it will be described in more detail below. The interrupt on line 47 is produced when a power loss is occurring, and in response, the microprocessor 20 takes certain emergency actions to insure that the system halts gracefully.

Referring particularly to FIG. 3, the local I/O section 3B of the processor module 3 connects to the address bus 21, data bus 22 and control lines 25 and 31 in the control section 3A described above. The local I/O section 3B is structured about a sixteen-lead shared address bus 101 and an eight-lead shared data bus 102. The shared address bus 101 may be driven by the address bus 21 when a set of tri-state gates 103 are enabled, and data may be conveyed between the shared data bus 102 and the data bus 22 when bi-directional gates 104 are enabled. The direction of data transfer is determined by the state of the RD control line 25 which is driven by the decoder circuit 26 in the control section 3A.

Similarly, a set of tri-state gates 105 connect the shared address bus 101 to an address bus 201 in the communications section 3C, and a set of bi-directional gates 106 connect the shared data bus 102 to a data bus 202. The shared address bus 101 may, therefore, also be driven by the communications section 3C of the processor module 3 and data may thus be transferred between the data buses 102 and 202 in a direction indicated by an RE control line 203.

An arbitration circuit 110 determines which section of the processor module 3 may have access to the shared buses 101 and 102. The circuit 110 may receive a request signal from the control section 3A through REQ line 111 (decoder circuit 26 in FIG. 2) or it may receive a request from the communications section 3C through a CREQ control line 112. The arbitration circuit grants the request to one section at a time by producing a signal either on a GRANT line 113 or a CGRANT line 114. Both of these signals are conveyed to inputs on the decoder circuit 26 in the control section 3A (FIG. 2) and they are employed to enable the respective gates 103, 104, and 120 or gates 105, 106 and 121. In this manner, either the control section 3A or the communication section 3C of the processor module 3 may have access and control of the local I/O section 3B.

The local I/O section includes a random access memory (RAM) 125 which connects to the shared address bus 101 and shared data bus 102. The shared RAM 125 stores data which is passed back and forth between the two other sections of the processor module 3, and it includes a remote I/O image table 126 and communications data 127. Data may be written to or read from an addressed location of the shared RAM 125 when the RAM 125 is enabled by address bus lead SA11 and a WRITE control line 128 is active. The WRITE control line 128 is driven by the processor section 3A or 3C which has ben granted control of the shared buses 101 and 102, and indeed, the shared RAM 125 occupies the same address space in each of these sections.

Referring still to FIG. 3, the local I/O section 3B also includes an eight-bit output latch 130 and a sixteen-bit input multiplexer 131. The output latch is enabled by address bus lead SA13 and the status of data bus lead SD0 may be written to one of the eight outputs as selected by the state of the three address bus leads SA0-SA2. One of these outputs drives the interrupt control line 46 connected to the priority encoder 48 (FIG. 2) and another output drives an interrupt control line 246 which produces a similar interrupt in the communications section 3C. Thus, by writing to the output latch 130 either section 3A or 3C of the processor module 3 may interrupt the other section, or even itself. A third output 132 from the latch 130 drives an I/O reset line which connects to each I/O module 4 in the local rack 1 via the motherboard. This output may be operated to disable all operating devices controlled from the local rack 1.

The input multiplexer is enabled by address bus lead SA14 and the state of any two of the sixteen inputs are read onto data bus leads SA0-SA2. These inputs monitor the battery back-up and a variety of switches which indicate alternative functions that may be implemented.

The shared buses 101 and 102 are also coupled to the backplane of the rack 1 by a one of sixteen decoder 135 and a set of bi-directional gates 136. An eight-bit byte of data may be written to or read from any one of sixteen I/O slots in the rack 1 when the address bus lead SA12 is enabled. The addressed slot is identified by the select code on address bus leads SA1-SA4. There are two I/O slots in each of the eight I/O modules 4 located in the rack 1 and either the control section 3A or the communications section 3C of the processor module 3 may thus read or write to any one of them.

The local I/O section 3B of the processor module 3 serves as a link between the other two sections. For example, the control section 3A periodically reads the state of the input devices connected to the local rack 1; updates its I/O image table 38 in the RAM 35 with this information; updates the output devices connected to the local rack 1; writes output data from its data table 38 to the I/O image table 126; and updates its data table 38 with the inputs from the I/O image table 126. The communications section 3C periodically updates the input section of the I/O image table 126 in the shared RAM 125 with the status of the input devices connected to the remote I/O racks 11 and reads the output portion of the I/O image table 126 for transmission to the output devices connected to the remote I/O racks 11. Programming terminal messages which are received by the communications section 3C are stored in the communications portion 127 of the shared RAM 125 and any responsive messages from the control section 3A are read therefrom.

Referring particularly to FIG. 4, the communications section 3C of the processor module 3 is structured about an eight-bit microprocessor 205 which drives the address bus 201 and the data bus 202. The microprocessor 205 operates in response to machine language program instructions which are stored in a read-only memory (ROM) 206 to carry out most of the communication section functions.

When the microprocessor 205 generates an address code on the bus 201 in which lead AD15 is active, a request is made through control line CREQ 112 for access to the local I/O section 3B. As indicated above, this request is applied to the arbitration circuit 110 in the local I/O section 3B (FIG. 3) and to the decoder circuit 26 in the control section 3A (FIG. 2). The decoder circuit 26 responds by generating a signal on a WAIT control line 207 which places the microprocessor 205 in a wait state until access is granted by the arbitration circuit 110. When access is granted, the decoder circuit removes the signal from WAIT control line 207, and the microprocessor 205 may then perform memory read and write operations on data stored in the shared RAM 125. Only a momentary pause in its operation occurs when the shared RAM 125 is already being accessed by the control section 3A.

A major function of the communications section 3C is to link the two serial channels 5 and 10 with data structures in the shared RAM 125. These are high speed channels and to facilitate the handling of interrupts from them, an eight-bit microcomputer 210 is employed. The microcomputer 210 includes an internal masked ROM (not shown) which stores machine language instructions that direct its operation. The microcomputer 210 shares an 8K by eight-bit random access memory (RAM) 211 with the microprocessor 205 and its primary function is to handle all interrupts from the serial channels 5 and 10 and couple data between these channels 5 and 10 and the RAM 211. The microprocessor 205 then transfers this data between the RAM 211 and the shared RAM 125 in the local I/O section 3B.

Referring still to FIG. 4, a counter/timer circuit (CTC) 208 connects to the buses 201 and 202 and to an interrupt terminal 209 on the microprocessor 205. The CTC 208 receives interrupt requests from the local I/O section 3B via control line 246 and interrupt requests from the microcomputer 210 through control line 212. The CTC 208 may produce an interrupt request on control line 213, and it is also configured as a timer which produces an interrupt request on the lead 211 every ten milliseconds. In response to an interrupt request from the CTC 208 which directs the microprocessor 205 to the appropriate interrupt service routine stored in the ROM 206.

The microprocessor 205 is coupled to the RAM 211 by a set of thirteen bus drivers 215 and a set of eight, bi-directional data gates 216. When the RAM 211 is addressed by the microprocessor 205, an arbitration circuit 217 is signaled by address bus lead AD15 and an MREQ control line 218. The arbitration circuit 217 places the microprocessor 205 in a wait state through control line 219 until access to the RAM 211 may be granted. At that point, the gates 215 and 216 are enabled through control line 220 and the microprocessor 205 is released from the wait state to complete either a read or write cycle to the RAM 211. The microprocessor's write enable control line (WE) 204 is coupled to the RAM 211 by a tri-state gate 221 to select either a read or write operation, and this same control line controls the direction of data flow through the gates 216.

The microcomputer 210 drives an eight-bit data bus 225 which connects to an address latch 226, a serial communications controller (SCC) circuit 227 and a set of eight, bi-directional data gates 228. It also drives eight higher order address lines which are combined with the lower order lines driven by the address latch 226 to produce an address bus 230. In a typical read or write cycle, the lower order address bits are stored in the address latch 226 when an address strobe line 231 is active and then the higher order bits are produced on the address bus 230 and data is conveyed through the data bus 225.

The microcomputer 210 may gain access to the RAM 211 in a manner similar to that employed by the microprocessor 205. When address bus lead MA14 is active, a request for access to the RAM 211 is made to the arbitration circuit 217. When access is granted, control line 235 is active and a set of bus drivers 236 and the bi-directional data gates 228 are enabled to couple the buses 230 and 225 to the RAM 211. A read or write cycle is executed, as determined by the state of WT control line 237, which is coupled to the RAM 211 by tri-state gate 238.

The SCC 227 is commercially available in integrated circuit form from Zilog, Inc. and it operates to service the two serial channels 5 and 10. When a byte of data is received at either channel 5 or 10, the SCC 227 interrupts the microcomputer 210 through a line 240 and the microcomputer 210 responds by reading a vector from the SCC 227 which points to the appropriate interrupt service routine stored in the microcomputer's internal ROM. The received byte of data may be combined with other received data to form a message from the programming terminal 6 or it may form a block of status information from an I/O rack 11. In either case, the information is placed in the proper form by the microcomputer 210 and written to a communication I/O image table 241 or a message data section 242 of the RAM 211. Similarly, the microcomputer 210 may read data from the RAM 211 and place it in a form for transmission on either of the serial channels 5 or 10. A set of DIP switches 248 are connected to the micro-computer 210 to set the address of the processor module 3 on the communication channel 10.

Data Structures

Referring particularly to FIG. 2, the RAM 35 stores a number of data structures which are employed by the sixteen-bit microprocessor 20 and the bit processor 30 to carry out their functions. As indicated above, these include the system data table 38 and the user control program 37 which are shown in more detail in FIG. 5.

The system data table 38 is comprised of separate data files, each of which contains a specific data type, and each of which performs a specific function in the operation of the programmable controller. Data file #0, for example, is an integer type file which functions as an output image table 260, and data file #1 is an integer type file which functions as an input image table 261. As in previous programmable controllers, the input image table 260 and the output image table 261 are images of the state of the I/O devices connected to the I/O modules 4 in the I/O racks 1 and 11. In the simplest form, each bit stored in the input image table 261 represents the state of a switch type input device and each bit of the output image table represents the on/off state of an output device. Data file #3 is also an integer type file which is dedicated to function as a status file 262. The status file 262 contains data defining the current status of the programmable controller system, such as arithmetic flags, I/O rack 1 module status, real time clock and calendar data, etc. A set of Data Table Pointers 265 is stored in a file directory in RAM 35 and is used to access the data files.

Figure 5:
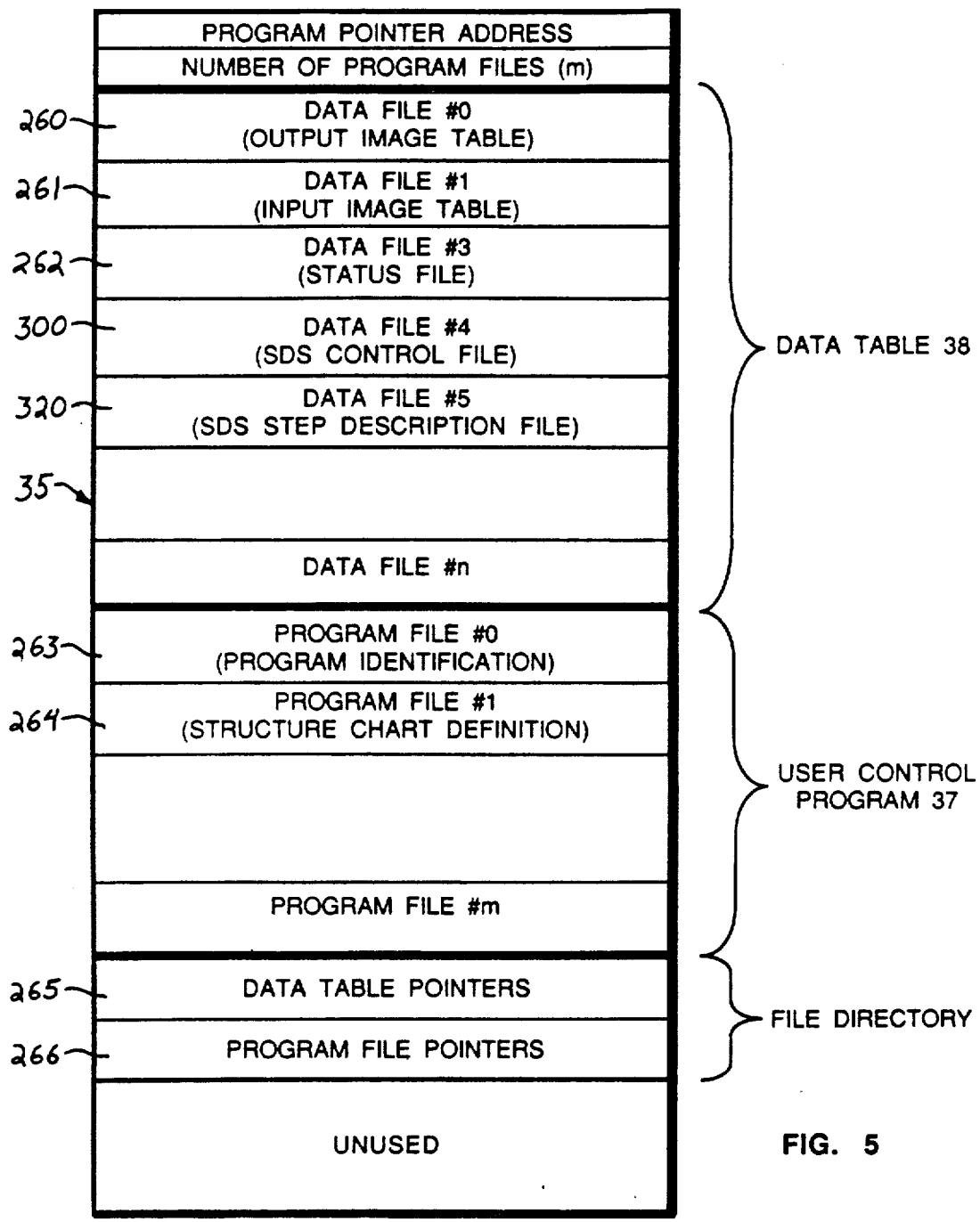
FIG. 5 is a memory map of a random access memory which forms part of the control section of FIG. 2.

The RAM 35 also stores the files which constitute the user defined control program 37, as illustrated in FIG. 5. Program files #0 and #1 are dedicated to specific functions, but the rest are variable in both type and size. Program file #0 is for program identification 263 and program file #1 is the active structure chart definition 264, or structure chart program. Each program file in the user control program 37 is identified by a program file pointer 266 which is stored in the file directory section of the RAM 35. Each such pointer indicates the program file type, absolute memory starting address and length of the program. Each pointer also indicates if the file is write protected (P), and it provides a checksum of the program file which is employed as a diagnostic tool.

There are three types of program files: ladder; structure chart; and machine language. Ladder program files are executed by the processor module 3 and are comprised of instructions of the type which are conventionally found in programmable controllers. The term "ladder" is derived from the ladder logic diagram format which is used to display the program on the programming terminal 6. The structure chart programs are executed by a structure chart interpreter routine similar to the one described in U.S. Pat. No. 4,742,443. Machine language program files contain instructions which are executable directly by the sixteen-bit microprocessor 20. These programs are employed to implement the dual language feature as described in U.S. Pat. No. 4,302,820.

The present system has enhanced the standard set of ladder diagram logic operations by adding a smart directed sequencer (SDS) function. In a conventional programmable sequencer, the steps are executed in a defined order upon the occurrence of the specified transition condition. However, the SDS function is more like a state machine in that a transition from one step can occur to one of several specified steps depending upon which one of several defined transition conditions is satisfied. Each transition condition is a state change of a given input device represented in the input image table 261. As will be described, this change may be defined as either a high to low or a low to high logic level transition.

Figure 6:
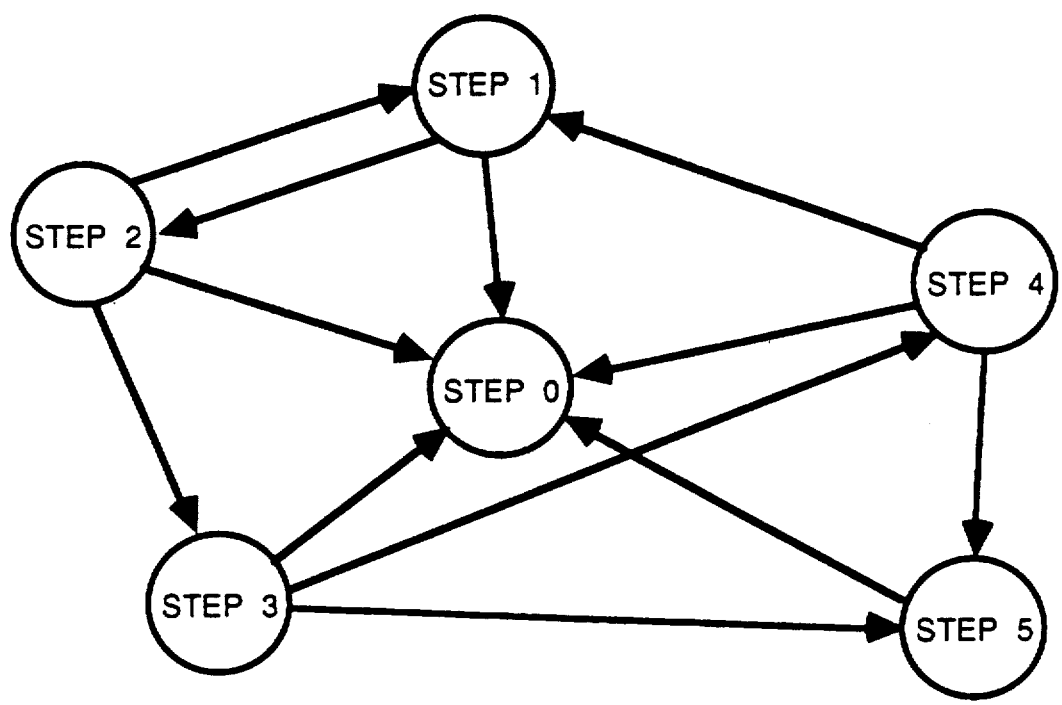
FIG. 6 is a state diagram of an exemplary control sequence to be performed by the present invention.

FIG. 6 illustrates the steps in an exemplary control process. Each step of the process represents a change in the states of the output devices coupled to the programmable controller. The arrows indicate the different transitions which may occur between the steps. For example, a normal transition can occur from step 2 to either step 1 or step 3, depending upon the status of selected inputs to the programmable controller. A transition can be defined from one step to only one other step, or to any one of several steps depending upon the state of different inputs to the programmable controller. Step 0 is the first step which is initially executed upon starting the control program. Thereafter, a transition back to step 0 usually occurs in an error condition, as will be described or upon a resetting of the system. It is apparent from the "state diagram" of FIG. 6 that the steps are not executed in numerical order nor in any other single defined order.

Figure 7:
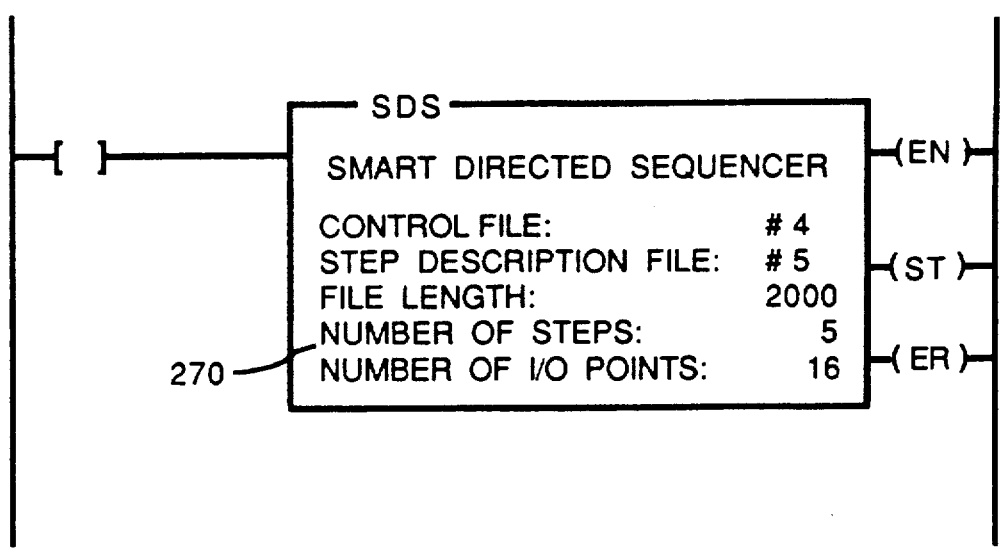
FIG. 7 is a representation of a rung of a ladder diagram control program, which incorporates the present smart directed sequencer, as the rung is displayed on a programming terminal.

The SDS function is embodied as another logic operation for a ladder diagram type control program, as shown in FIG. 7. However, data specified by the user for the SDS function is considerably more elaborate than the typical ladder logic operation. As defined on the ladder diagram, the SDS operation box 270 specifies the number of a control file 267 in the system data table 38 in RAM 35 which contains global information relative to the control sequence. The system data table 38 also contains a Step Description File 268 which contains data defining each sequence step and the conditions for a transition between steps to occur. The number of the step description data table file is listed on the ladder rung. The SDS operation box 270 also specifies the length of the Step Description File and the number of steps in the control sequence. The number of inputs and outputs from the I/O image tables which are used in the sequence is defined entered by the user in the SDS operation box 270. A large programmable controller system can have several hundred I/O points and the sequencer operates on a subset of these points. In order to increase operating speed, the allocation of I/O points is limited to entries of 8, 16 or 32 inputs and an equal number of outputs. As will be seen, since each step transition in the sequence is determined by a change in the state of an input bit, the selection of the limit on I/O points also limits the total number of possible transitions from any one sequence step.

Figures 8, 9:
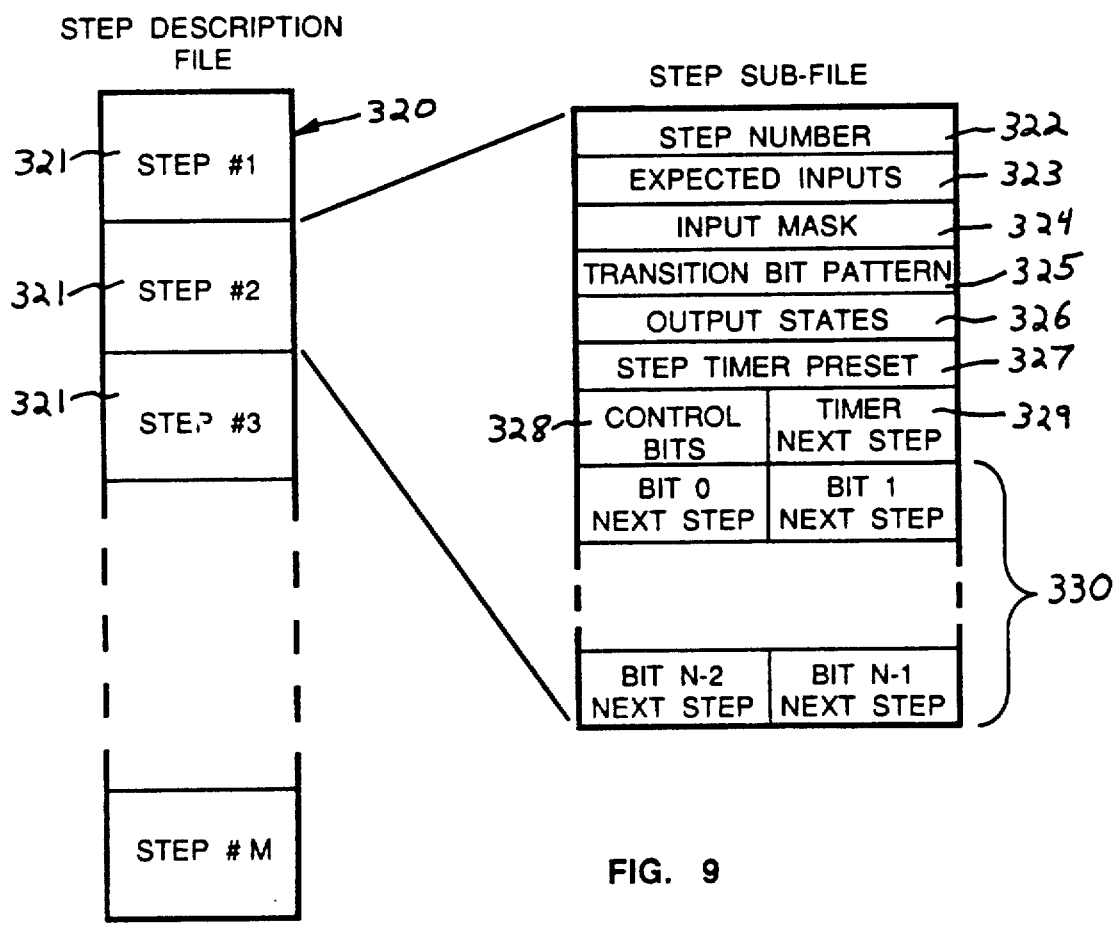
FIG. 8 depicts the data structure of the control file for the sequencer function.
FIG. 9 depicts the data structure of the step description file for the sequencer function.

The SDS control file 300 has a structure depicted in FIG. 8. The first data block 301 of the SDS control file contains a word formed by control and status bits which among other things indicate whether various processing options are enabled or disabled, as will be described subsequently. The length of the Step Description File 321 and the number of sequence steps are stored in the next two data blocks 302 and 303 respectively. These data enable the software which performs the SDS function to locate other data within the control file. The fourth data block 304 of the control file 300 is used to store the numerical designation of the current step of the control sequence and the fifth data block 305 stores the designation of the previous step. The previous step information is employed to provide a history of the control process in the event of an error condition, as will be elaborated upon.

The next two file data blocks 306 and 307 contain the status of the specific ones of the programmable controller inputs and outputs which have been selected to be operated upon by the SDS control sequence. Each block is 32 bits wide and together represent an I/O image sub-table for the SDS function with each bit corresponding to the state of a selected input or output. As will be described, the data bits representing the state of the I/O devices selected for the SDS function are copied (or mapped) between the SDS control file 300 and the main I/O image tables 260 and 261 in system data table 38. The mapped input block 306 is updated at the start of the execution of the SDS function in the ladder logic control program. The addresses of each selected I/O device status bits in the main I/O image table 261 (FIG. 5) are sequentially stored in data block 313 at the end of the Control File 300. After the evaluation of whether a sequence step transition should occur, the mapped output bits in file block 307 are copied into the corresponding locations in the main output image table 260 (FIG. 5). For this purpose the corresponding addresses for output image table 260 are stored in data block 314 of the SDS Control File 300.

Each step of the control sequence has a time limit so that if the SDS function remains in the same step for more than the specified interval, a sequence step transition will occur regardless of the state of the inputs. The timer control data block 309 contains the preset and accumulated timer values and a timer enable flag for the currently active step. The use of this timer data will be described subsequently.

One of the other features of the SDS function is the capability of generating error messages via the processor module's communication section 3C (FIG. 4). A message control data block 310 in the control file 300 contains address and other data to enable the error message to be set to a receiving device, such as the terminal 6. The actual message is stored in control file block 311. Finally, a group of words in data block 312 is assigned for internal usage as temporary storage locations and as a message buffer when several messages are to be sent.

As discussed above, the other data file maintained for the SDS function is the Step Description File 320, which has structure depicted in FIG. 9. The Step Description File 320 comprises a separate sub-file 321 for each of the steps in the sequence. Each step sub-file consists of a series data blocks containing descriptive information that defines the machine control for that step. The data blocks for the second step sub-file have been expanded in the figure. The first word 322 in the step sub-file contains the step number and serves as a checking mechanism to insure the proper step in the file has been accessed. The second sub-file entry 323 contains data bits which indicate the state of the input devices that are expected when the step is entered. As will be described, this entry 323 is used to detect an error in the control sequence should the actual device inputs be other than expected.

A process sequence step transition occurs when a specified input bit makes a high to low or a low to high logic state transition. Not all of the input bits designated in control file block 306 is used in determining whether a transition from this step should occur. For example, since only two transitions can occur from step 2 in the sequence of FIG. 6, only two input bits are used in indicating whether a transition should occur from this step. An input data mask is stored in the next sub-file entry 324 and is used to filter out input bits, the state of which are not to be used in determining if a transition should be made to another step. Step sub-file entry 325 identifies the type of transition rising or falling which determines the desired next step. Each bit in this transition bit pattern indicates the type of stat transition for a corresponding bit in the mapped inputs. A bit location in this entry is a zero if a high to low state transition is specified, or a one if a low to high state transition is to be used. In addition, the states that the mapped outputs are to assume in this control step are stored in sub-file entry 326.

The step timer limit preset value is retained in a two word sub-file entry 327. A byte 328 of the next step sub-file entry contains control and status bits for this step and the other byte 329 identifies the next step to be executed in the event the step timer expires. The remainder 330 of the step sub-file contains a look-up table for determining the desired next step based on an individual input bit transition. Depending upon the number of input devices selected for the SDS function, there may be up to 32 entries (one entry for each input device) in the look-up table with each one byte entry indicating the number of the next step to execute upon a change in state of the respective input device. It should be noted that not every input device is used to signal a step transition in which case its corresponding next step entry in the look up table will be zero.

Sequencer Operation

The user employs the programming terminal 6 and its program editing software to construct the ladder diagram in much the same manner as in previous programmable controllers. The SDS function is selected by pressing an appropriate key combination on the keyboard 7 and a rung similar to that shown in FIG. 7 is displayed on the CRT display 8. Once the user has filled in the information in the SDS block using the cursor and other keys on the terminal, the control program editing software in the terminal steps the user through other display screens in which the control file and step description file data are entered.

Specifically, for each step of the sequence the user enters data regarding the normal transitions which can occur to other sequence steps and the input condition that is to cause each transition. With reference to FIG. 6, a normal transition can occur from step 2 to either step 1 or step 3. For example, during programming the user specifies that a transition from step 2 to step 1 will occur upon a high to low change in the state of the input device having the logical address 21. The program editing software converts this entry format into the data structures for the SDS function that have been described previously. Specifically, one of the mapped input bits (e.g. the third bit) in the control file 300 is assigned by the editing software to the input device at address 21. In doing so, the logical address (21) of the designated input device is stored in the third location of the input bit address table 313 in the SDS control file. The third bit of the input mask 324 step description sub-file 321 for step 2 is set to indicate that the corresponding mapped input bit is relevant to making a sequence step transition determination. At the same time, a zero logic level is stored in the third bit position of the transition bit pattern 325 to indicate that a high to low input change is to be used. In addition, the number of the sequence step to which the transition should be made (e.g. sequence step 1) is stored in the third location in the next step look up table 330 for step 2. Another set of data entries in the step description sub-file is made to define the transition from step 2 to step 3. During the creation of the data structures, the output states for step 2 are stored in its step description sub-file, and the corresponding logical addresses for the output devices are stored in the output bit address table 314 in the SDS control file 300.

Figure 10:
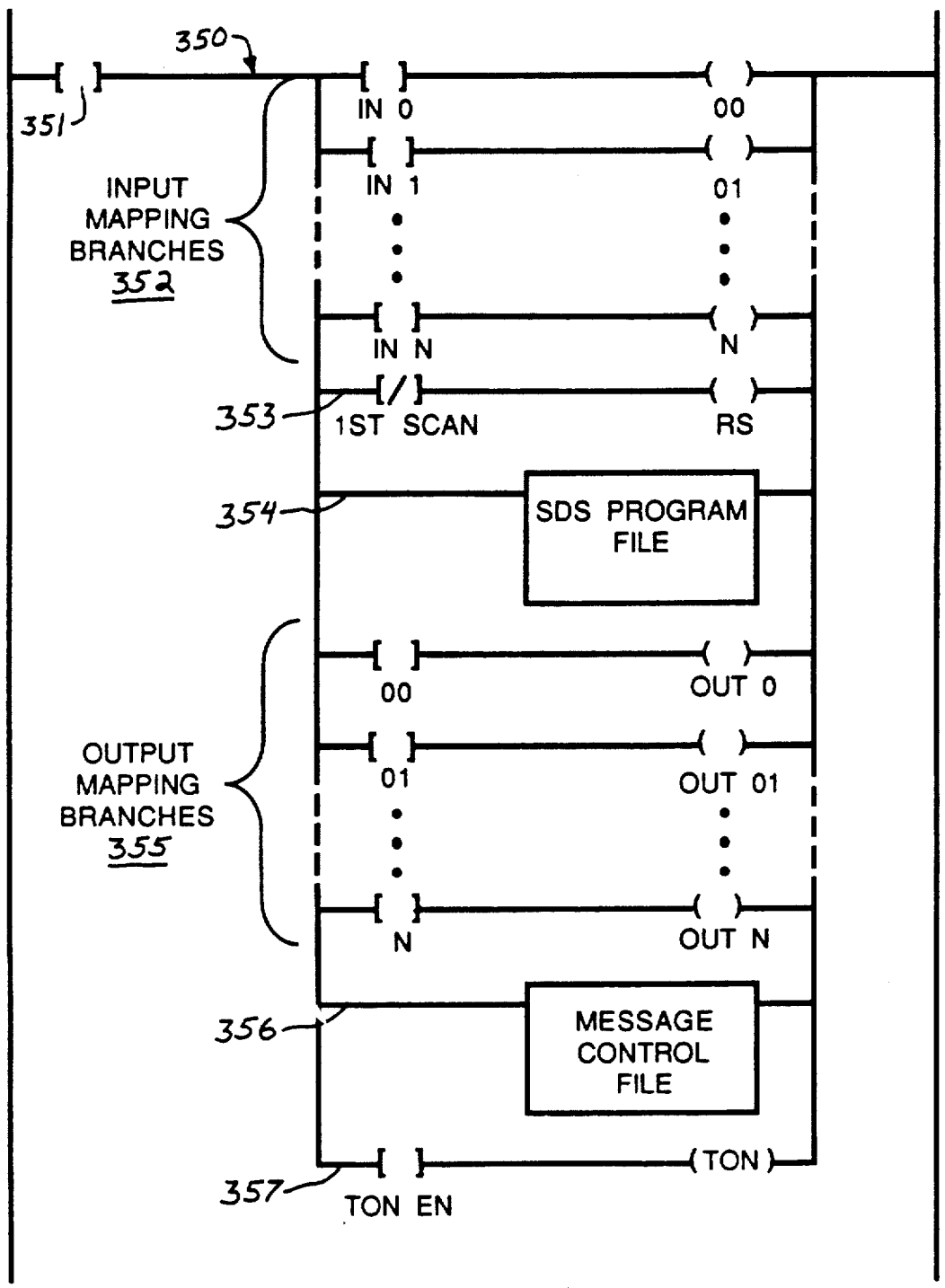
FIG. 10 illustrates the actual ladder logic control program branches for the sequencer function.

The program editing software also uses the SDS configuration information to create a ladder program rung 350 similar to that shown in FIG. 10. The actual SDS function ladder rung 350 consists of a set of parallel branches 352-357. Although the actual program rung is similar to FIG. 10, the terminal 6 displays the rung as shown in FIG. 7, i.e. the SDS function is represented by a single block on the CRT display 8 and not as a series of parallel rung branches.

Unlike conventional ladder diagram program rungs, the SDS function is always executed regardless of the rung being true or false. However, the truth of the rung does determine how the SDS function operates with a transition occurring to sequence step 0 when the rung is false. The truth of the rung is determined by operator 351, which can be a standard bit examination instruction for example, and is stored in a register in microprocessor 20.

An initial group 352 of the parallel SDS rung branches contains conventional "examine if closed" (XIC) input instructions and output instructions to one of the bit locations in the mapped input block 306 of the SDS control file 300 (FIG. 8). A separate one of these branches 352 is created by the terminal's control program editing software for each mapped input bit. In creating this group of branches 352, the software sequentially uses each input bit address in block 313 of the SDS control file 300 to form an XIC instruction for that bit address in the main input image table 261 of the system data table 38. An output instruction is also formed on the branch to store the input state bit in its assigned position in the mapped input data block 306 of the SDS control file. When the rung is true, the input mapping branches 352 update the mapped input block 306 with the current status of the associated input devices.

Following the group of input mapping branches 352 on FIG. 10, is a branch 353 which examines a flag bit in the programmable controller status file 261 that indicates whether this is the first scan through the ladder diagram following a system restart. If the rung is true and this is the first scan through the program, branch 353 sets the rung status bit (RS) in the SDS control/status block 301.

The next SDS rung branch 354 calls the SDS machine language routine in the programmable controller's firmware which executes the sequencer function. This branch is executed, regardless of the truth of the rung, by a macro-instruction routine in the firmware of the processor module 3. The SDS macro-instruction routine is graphically depicted in the flow chart of FIGS. 11A and 11B. Each time that the SDS function is invoked, certain conditions are checked before entering the normal mode of operation. The first condition is the rung status which is checked at program step 400. If the rung is false as indicated by the contents of the register in the microprocessor 20, the program execution transfers to step 401 where the sequencer is placed in step 0. This transition to step 0 is accomplished by copying the contents of the current step number data block 304 of the SDS control file 300 into the previous step number data block 305. Then, the current step number data block is zeroed. Next, the mapped output devices are turned off by loading the mapped output data block with all zero bits at program step 402. The rung status register in microprocessor 20 is then set true at program step 403. The SDS macro-instruction routine then returns to the ladder interpreter program where, because the rung is now set true, the output mapping branches 355 transfer the mapped output bits from SDS control file block 307 to the output image table 260, which ultimately turns the associated operating devices off.

If the rung is true upon entering the SDS machine language routine, the execution will advance to program step 404 where data block 304 is inspected to determine if the sequencer is in step 0. If so, a branch to program step 407 takes place. Sequence step 0 initializes the sequencer at which point a determination is made as to which of the other steps in the sequence coincide with the current status of the equipment being controlled. The initial function for sequence step 0 is to set the contents of a memory location which serves as a a step counter to one at program step 407. The step counter is used to access each of the step description subfiles 321 depicted in FIG. 9. Then at program step 408 the mapped input bits in control file block 306 are ANDed with input bit mask 324 for the currently accessed sequence step to filter out the input bits which are irrelevant to determining whether or not to enter that step. The result of this masking operation is then compared with expected input bits for the step which are stored in entry 323 of the step's description sub-file 321.

If the two bit patterns are not identical, the program execution branches to step 410 where the contents of the step counter memory location are incremented and then checked at program step 411 to determine if there are sequence steps remaining to be checked. If there are steps remaining, the program returns to step 408 where the mapped inputs are masked and compared with the expected inputs for the next numerical sequence step. This looping continues until all of the sequence steps have been examined, at which point if a match in the bit patterns has not been found, the SDS macro-instruction execution routine ends and returns to the ladder diagram interpreter routine. In order for the program to commence at a given step, a designated set of inputs must have the correct state.

Figure 11A:
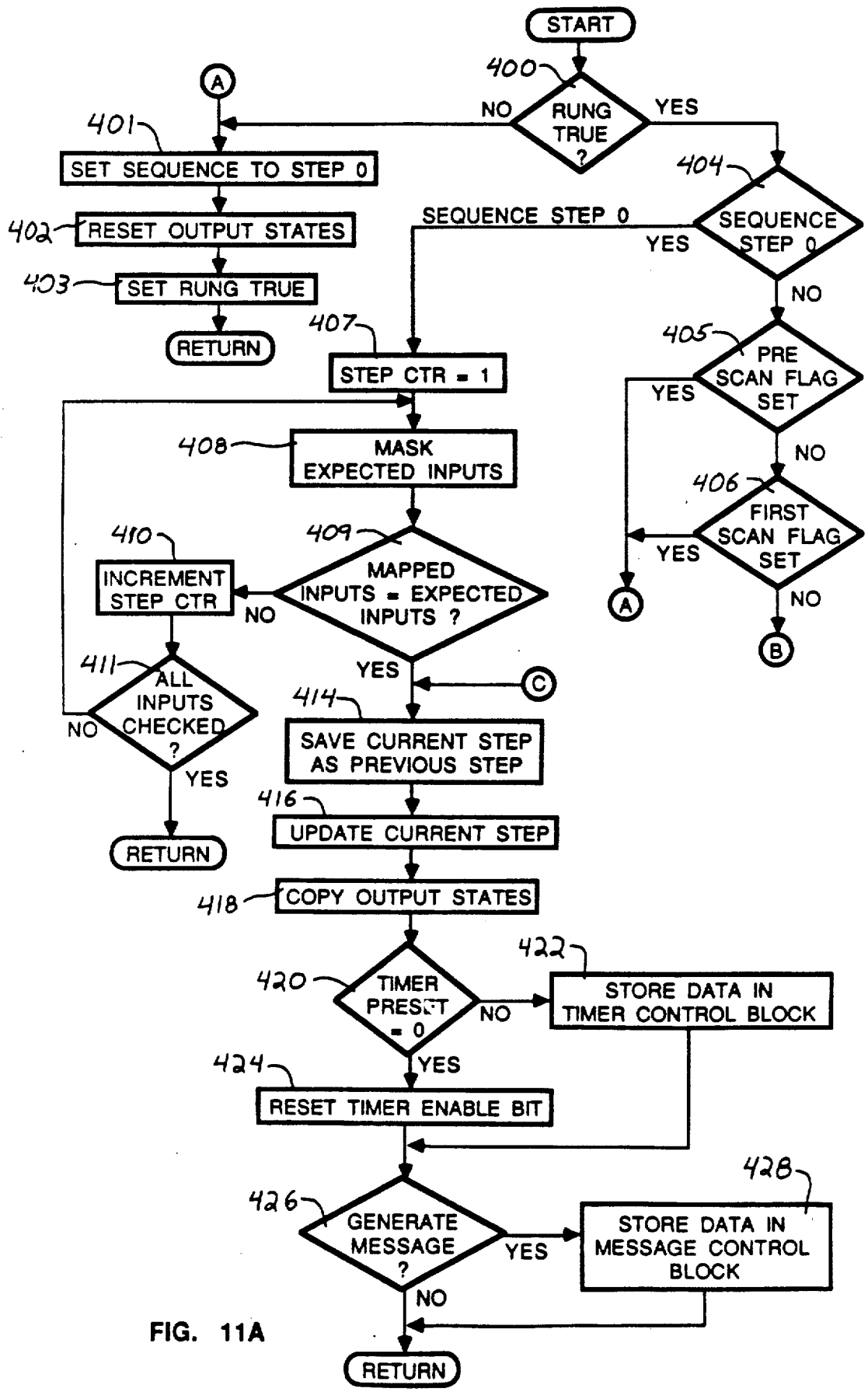
FIGS. 11A and 11B represent a flow chart of the machine language control program for the sequencer function.

Referring still to FIG. 11A, once a match has been found at program step 409 between the expected inputs for a given step and the mapped inputs, the sequencer is placed into that given step. This is accomplished at program step 414 by copying the current step number from block 304 of the SDS control file 300 into the previous step number block 305. Then the contents of the step counter memory location, which indicates the number of the sequence step at which an input bit pattern match was found, is transferred into the current step number data block 304 of the SDS control file. Next, at program step 418, the output states stored in entry 326 of the step description sub-file 321 for the given step are copied into the mapped output block 307 of the control file.

Thereafter, the step description file 321 for the given sequence step is checked to determine if the step timer preset block 327 has a non-zero value at program step 420. A non-zero value indicates that the step timer is to be enabled upon entering the given sequence step. If a non-zero value is found, the microprocessor 20 at program step 422 copies the step timer preset value into the timer control data block 309 in the SDS control file, and sets a timer enable flag in the control/status data block 301. Alternatively, if the timer preset value in the step description sub-file is zero, the timer enable flag is reset at step 424 before the program advances.

Then the step description sub-file 321 is checked again to determine if a message should be generated as indicated by a message bit within the control bits 328 of the step description sub-file. For example, upon entering certain sequence steps, a message may be sent to the programming terminal 6 to notify the user. If a determination is made at program step 426 that a message is to be generated, the data regarding that message is accumulated and stored in the message control block 310 of the SDS control file 300 and a message enable flag is set in control/status block 301 at program step 428. The message flag is automatically reset by the firmware task which transmits the message. Once the message has been formulated and stored, the SDS machine language routine terminates by returning to the ladder diagram interpreter routine.

Referring again to FIG. 10, the termination of the SDS machine language routine advances the ladder program from branch 354 to a group of parallel branches 355 which transfer the mapped output state bits in SDS control file data block 307 to the corresponding addresses in the main output image table 260 (See FIG. 5). These ladder branches 355 were formed by the program editing software within the programming terminal 6 upon the creation of the ladder logic control program and the SDS function data files. The formation of these branches is similar to the formation of the input mapping branches 352. However, each of the output mapping branches 355 consists of an input instruction which causes the microprocessor 20 to obtain the value of one of the mapped output bits within SDS control file data block 307. Then the branch utilizes a conventional output enable (OTE) instruction to command the microprocessor 20 to transfer that status bit to the corresponding output image table location pointed to by an address in data block 314 of the SDS control file.

Following the copying of each of the output bits from the SDS control file 300 to the main output image table 260, the next SDS function ladder branch 356 instructs microprocessor 20 to examine the message enable flag within the control/status data block 301. If the message enable flag is found to be set, indicating that a message is awaiting transmission, the microprocessor 20 calls a conventional message handling task within its firmware to obtain the message control block 310 and the message data block 311 from the SDS control file and transmit the message to the designated receiving device.

Following the sending of any messages, the ladder diagram program advances to rung branch 357 where the timer enable flag within the control/status block 301 of the SDS control file 300 is examined to determine if the timer is functioning. If the timer flag is set, the microprocessor 20 enables the timer operation utilizing a conventional timer on (TON) ladder diagram instruction. With the timer enabled, the microprocessor operation is periodically interrupted at a fixed interval of time and the contents of the timer control block 309 are decremented. After the timer is enabled, the SDS ladder rung terminates advancing the execution to the next rung in the ladder.

Referring again to the flow chart of FIG. 11A, if the sequence is not in step 0 when the SDS machine language routine is entered and the SDS rung is true, the execution of the routine will advance to program step 405. When the programmable controller is placed in the program run mode, the ladder control program is prescanned so that the I/O image tables are placed in their proper states to control the equipment connected to the programmable controller. The prescan is indicated by a flag stored in system status file 263 of the system data table 38 (FIG. 5). This flag is checked and if the system is in the prescan mode, the SDS macro-instruction routine branches to step 401 where the SDS function is placed in sequence step 0 as previously described. A similar initialization, although not as extensive, occurs during the first scan through a ladder program called by a new function chart descriptor file. This first scan is indicated by another flag in the system status file 263. If the system is in the first scan mode, the SDS machine language routine also branches from program step 406 to step 401 to initialize its control sequence.

Figure 11B:
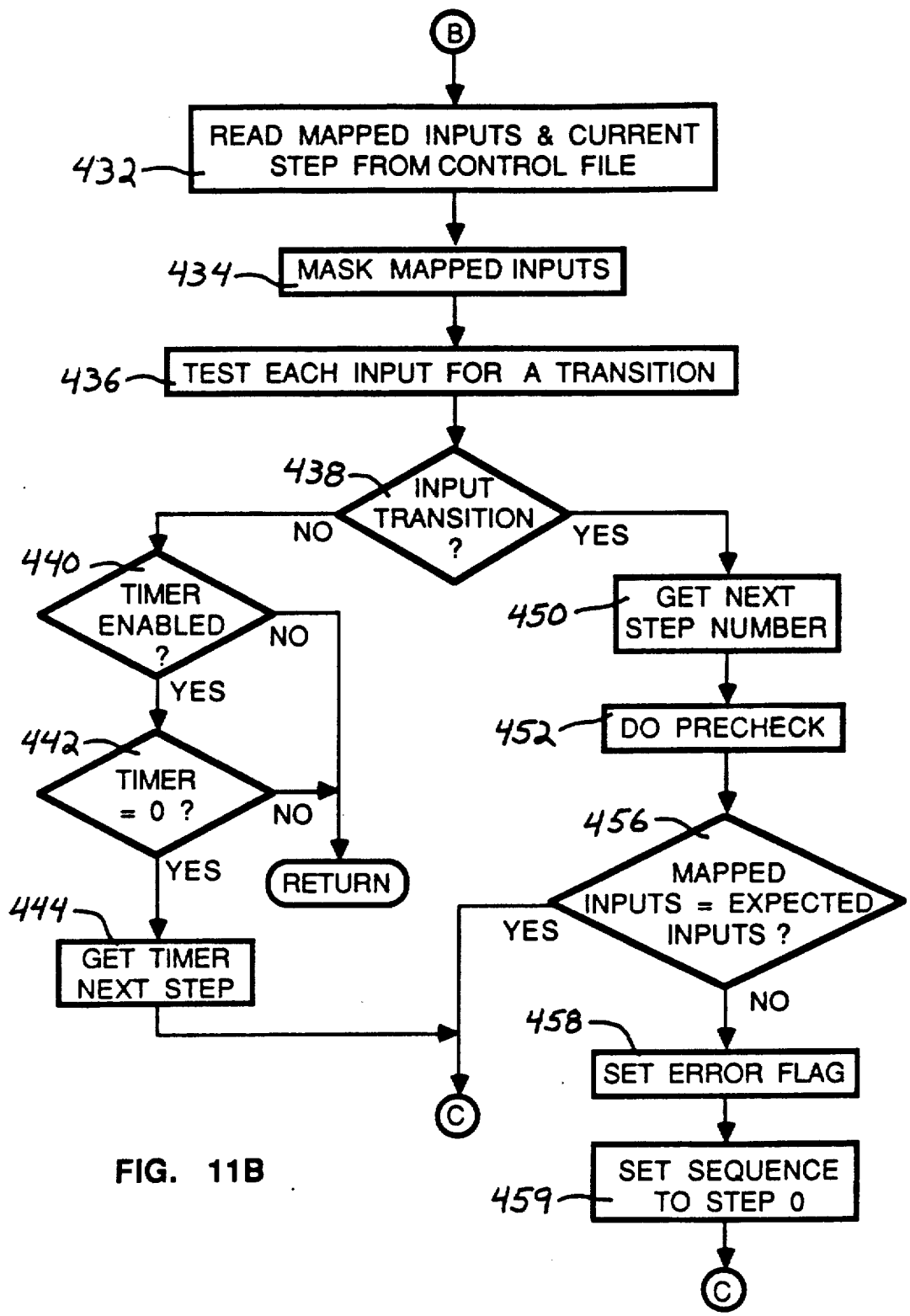

On subsequent scans of the ladder logic control program, the SDS rung will be found to be true and the program execution will pass through steps 400 and 404-406 to step 432 on FIG. 11B. At this point, a determination is made by the processor module 3 as to whether a transition to another step in the sequence should occur. The initial step 432 in making this determination is to obtain the mapped input bits and the number of the current sequence step from the SDS control file 300. The microprocessor 20 uses a current step number to access the corresponding step description sub-file 321. From that sub-file, the microprocessor initially obtains the input mask 324 and logically ANDs the mask with the mapped input bits to filter out those of the mapped input bits that are irrelevant to detecting whether a transition from the current step should occur. The result of the masking operation is a pattern of bits in which the irrelevant bits are all zeroed. The microprocessor 20 then compares each of the bits within the masked result with the expected inputs and the transition bit pattern stored in entries 324 and 325 of the step description sub-file 321 to detect whether a designated state change has occurred in any of the selected programmable controller inputs. Such a designated state change indicates that a sequence step transition should occur and if so to which is the next step.

If none of the input bits examined at program step 436 has undergone the defined state change, the program execution branches from program step 438 to step 440 where the microprocessor 20 examines the timer enable flag within the control/status block 301 of the SDS control file 300. If the timer is not enabled, the SDS machine language routine terminates returning to the standard ladder diagram interpreter routine. When the timer is enabled, the program execution advances to step 442 where the accumulated value of the timer in the SDS control file block 309 is tested to determine if it has timed out. If the timer is still active, the SDS machine language routine also terminates. On the other hand, when the timer has expired, the microprocessor at program step 444 obtains the data from the timer next step entry 329 within the step description file which indicates the next step to which the sequence should advance. The program then jumps to program step 414 where the indication of the next step is utilized by program steps 414-430 to advance the SDS function to the next sequence step.

Upon a designated input state change being found at program step 438, the program execution branches to step 450 where the transitioning bit's location within the mapped input data block 306 is used to index to the byte within the next step table 330 of the step description file which indicates the number of the next step in the control process sequence. This byte is placed into a temporary storage location. Then, at program step 452, a pre-check is made to determine if the state of the mapped inputs coincide with the necessary states in order to enter the designated next step of the sequence. This pre-check can be used as a form of error checking to determine when an invalid transition occurs. The mapped input bits in file block 306 are compared at program step 456 to the expected input bits in sub-file entry 323 for the new sequence step. The input mask 324 in the new step's description file is used to filter out the irrelevant bits from the mapped input bits. If the mapped input bits coincide with the expected input bits at step 456, the program execution jumps to step 414 where an orderly transition to the next sequence step is accomplished.

However, if the two bit patterns do not coincide at program step 456, an error flag is set at program step 458 and the temporary storage location which is designated to hold the number of the next step is set to step 0 at program step 459. In this situation, step 0 is a default step to which the sequence returns in the event of an error condition.

Then the program execution jumps to step 414 to make a transition to step 0 and generate an error message. In generating the message the message data block 311 in the SDS control file is loads with the number of the step from which an erroneous transition occurred, a designation of the input bit which resulted in the error and the input bit's state when the error occurred. This error message data is used by the message handling task to inform the system user of the error and the conditions which lead to the error. The message provides information which the user can employ to diagnose the problem causing the malfunction.

We claim:

1. In a programmable controller having a processor which repeatedly executes instructions in a stored control program to examine the status of input devices connected thereto and couple their status to a logic unit, and to operate output devices connected thereto in accordance with the condition of the logic unit, the programmable controller having conductors coupled to the processor for carrying data and control signals, the improvement therein comprising:

a first means, coupled to the conductors, for storing data regarding each step in a machine control process with the data for each step comprising: states for the output devices, a designation of other steps in the process to which a transition may occur, and for each designated other step a designation of a change in the status of the input devices which is to cause a transition to that designated other step;

a second means, coupled to the conductors, for storing an indication of the step of the process which is currently active;

means for setting the states of the output devices to the states stored for the currently active machine control process step, said means for setting coupled to the conductors;

means for detecting the occurrence of a designated change in the status of the input devices, said means for detecting coupled to the conductors; and means, coupled to the conductors, for loading data into said second means for storing, said means for loading being responsive to said means for detecting to load said second means for storing with an indication of the designated other step associated with the detected change in the status of the input devices.

2. The programmable controller as recited in claim 1 wherein:

the data for each step that is stored in said first means for storing further comprises expected states of the input devices for each step; and said means for loading only loads the indication of the designated other step associated with the detected change when the expected states of the input devices for that designated other step coincide with the actual states of the input devices.

3. The programmable controller as recited in claim 2 further comprising a means for generating an error indication when the expected states of the input devices for that designated other step do not coincide with the actual states of the input devices.

4. The programmable controller as recited in claim 2 wherein said means for loading loads an indication of a default step of the process upon the expected states of the input devices for the designated other step not coinciding with the actual states of the input devices.

5. The programmable controller as recited in claim 1 further comprising:

means for timing the interval of time which elapses after the means for loading loads data into the second means for storing; and wherein said means for loading responds, when said means for timing indicates that a predetermined amount of time has elapsed, by loading a designation of a predefined step of the process into said second means for storing.

6. The programmable controller as recited in claim 5 wherein said first means for storing further has a location associated with each step to store an indication of the predetermined amount of time which is to elapse.

7. A programmable controller which comprises:

a memory which stores a ladder logic control program, an input image table containing data representing the states of input devices coupled to the programmable controller, an output image table containing data representing the states of output devices coupled to the programmable controller, and macro-instruction execution routines;

a processor means for executing selected ones of the macro-instruction routines in response to instructions of the ladder logic control program, said processor means coupled to said memory to obtain macro-instruction routines and data therefrom and to write data into said memory;

a set of storage locations in said memory for storing data defining each step in a process with the data for each step including: the states for selected output devices, a designation of other steps to which a transition from that step may occur, and for each designated other step the state of an input device which indicates that the transition to that other step should occur;

a data storage location in said memory which stores a designation of the step which represents the current state of the process;

said processor means responsive to the ladder logic control program for executing associated macro-instruction routines to:

(a) transfer the data, representing the states for selected output devices for the step designated in said data storage location, from said set of storage locations into the output image table;

(b) compare data in the input image table to the data stored for the step designated in said data storage location which indicate that the transition to another step should occur; and (c) in response to the comparison indicating a step transition should occur, load the data storage location with a designation of a step in the process to which the transition is to occur.

8. The programmable controller as recited in claim 7 wherein:

the data for each step that is stored in said set of storage locations further comprises expected states of the input devices for each step; and wherein said processor only loads a designation of a step into said data storage location when the expected states of the input devices for that step coincide with the states of those input devices stored in the input image table.

9. The programmable controller as recited in claim 8 further comprising a means for generating an error indication when the expected states of the input devices for that step do not coincide with the states of those input devices stored in the input image table.

10. The programmable controller as recited in claim 8 wherein said processor loads an indication of a default step of the process upon the expected states of the input devices for a step not coinciding with the states of the input devices stored in the input image table.

11. The programmable controller as recited in claim 7 further comprising:

means for timing the interval of time which elapses following the loading of the designation of a step into said data storage location; and wherein said processor responds to an indication from said means for timing that a predetermined amount of time has elapsed by loading a designation of a predefined step of the process into said data storage location.

12. The programmable controller as recited in claim 11 wherein said set of storage locations also has a location associated with each step to store an indication of the predetermined amount of time which is to substantially elapse after the loading of the designation of a step into said data storage location until the processor responds to the means for timing.

13. A programmable controller which comprises:

a processor means for executing a user control program;

a memory which stores the user control program, an input image table containing data representing the states of input devices coupled to the programmable controller, and an output image table containing data representing the states of output devices coupled to the programmable controller;

a set of storage locations in said memory for storing data defining each step in a process with the data for each step including: the states for selected output devices, a designation of other steps to which a transition from that step may occur, and for each designated other step the state of an input device which indicates that the transition to that other step should occur;

a data storage location in said memory which stores a designation of the step which represents the current state of the process;

means for advancing from one step of the process to another step which includes:

(a) means for comparing data in the input image table to data stored in said set of storage locations for each step to detect when a transition to another step should occur, and upon detecting that a transition should occur producing an indication of the next step in the process;

(b) means, responsive to the means for comparing producing an indication that a step transition should occur, for loading the data storage location with a designation of the next step in the process and for transferring the data representing the states for selected output devices for the next step into the output image table.

14. The programmable controller as recited in claim 13 wherein the data for each step that is stored in said set of storage locations further comprises data designating expected states of the input devices for each step; and further comprising means, coupled to said set of storage locations, for inhibiting said means for loading and transferring when the expected states of the input devices for the next step do not coincide with the state of those input devices stored in the input image table.

15. The programmable controller as recited in claim 14 further comprising means, responsive to the means for inhibiting, for loading data storage location with a designation of a default step in the process.

16. The programmable controller as recited in claim 15 further comprising:

means for timing the interval of time that the process remains at a given step; and means for loading a designation of a predefined step of the process into said first storage location in response to said means for timing indicating that the process has remained at a given step for a predetermined amount of time.

17. In a programmable controller which includes a first means for storing an input image data table, a second means for storing an output image data table, and a first means for repeatedly executing a set of ladder logic instructions of a control program which cause the first means for executing to examine data from the input image table and generate data for the output image table; an improvement comprising:

a third means for storing data which define a state machine by specifying expected input data for each one of a plurality of states and specifying a set of state output data for each one of the plurality of states;

a second means for executing a state machine instruction, which instruction is part of the control program, by examining the expected input data to determine which one of a plurality of states the state machine should be in, and then sending state output data for that one state to the output image table.

18. The programmable controller as recited in claim 17 wherein second means for executing examines the expected input data upon detecting a change in a predefined set of data in the input image data table.

19. The programmable controller as recited in claim 17 wherein each state machine instruction in the control program contains an identification of a means for storing data which define that state machine.

20. The programmable controller as recited in claim 17 wherein each state machine instruction is a ladder logic output instruction in the control program which invokes said second means for executing.

21. The programmable controller as recited in claim 20 wherein the execution of each state machine instruction is affected by execution of a ladder logic input instruction in the control program.

22. In a programmable controller which operates an apparatus and which includes a memory for storing an input image data table and an output image data table, a processor that executes a control program, and a signal bus connecting the processor to the memory; an improvement comprising:

a first means, coupled to the signal bus, for storing data which define a state machine by specifying expected input data and a set of state output data for each of a plurality of states of the apparatus;

a second means, coupled to the signal bus, for storing the control program which includes a series of ladder logic instructions that cause the processor to examine data from the input image data table and generate data for the output image data table, one of the ladder logic instructions being a state machine instruction that causes the processor to examine the expected input data to determine in which one of a plurality of state the apparatus is functioning, and then send the set of state output data for that one state to the output image data table.

23. The programmable controller as recited in claim 22 wherein said means for executing examines the expected input data upon detecting a change in a predefined set of data in the input image data table.

24. The programmable controller as recited in claim 22 wherein the state machine instruction contains an identification of the first means for storing as containing data that defines the state machine.

25. The programmable controller as recited in claim 22 wherein the state machine instruction is a ladder logic output instruction in the control program.

26. The programmable controller as recited in claim 25 wherein the execution of the state machine instruction is affected by execution of a ladder logic input instruction in the control program.

* * * * *